Jan. 11, 1927. 1,614,145
S. A. MOSS
TURBINE ROTOR
Filed Sept. 11, 1925
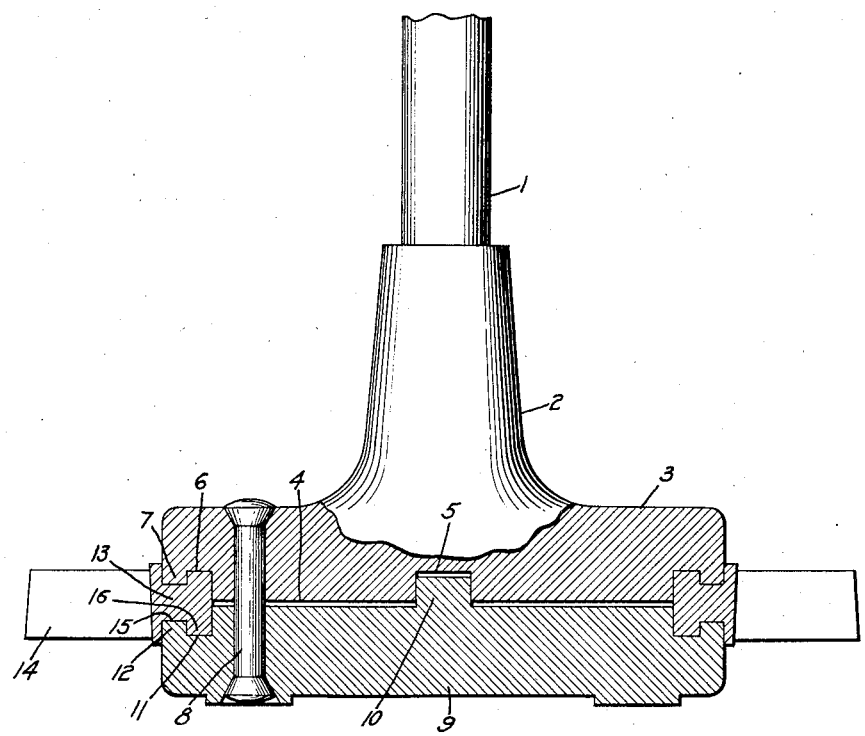
Inventor:
Sanford A. Moss,
by
His Attorney.

Patented Jan. 11, 1927.

1,614,145

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

TURBINE ROTOR.

Application filed September 11, 1925. Serial No. 55,825.

In connection with certain turbine applications such as, for example, exhaust gas driven turbo-compressors, utilized for supercharging internal combustion engines, the turbine rotor is required to operate at very high speed and is subjected to very high temperatures. For example, it may be required to operate at speeds of the order of 30,000 to 40,000 revolutions per minute and at temperatures of the order of 1400 degrees F. This is service of severe character and requires that the rotor be strong and that the buckets be securely attached to it.

The object of my invention is to provide an improved rotor construction which while being strong and thoroughly capable of operating under conditions of the character of those set forth above, is at the same time comparatively light in weight, simple in structure, and capable of being manufactured at low cost.

For a consideration of what I believe to be novel and my invention, attention is directed to the accompanying description and the claims appended thereto.

In the drawing, the figure is a side view, partly in section, of a rotor embodying my invention.

Referring to the drawing, 1 indicates a turbine rotor shaft, which may be mounted in a suitable bearing or bearings (not shown) and which may drive a compressor or other machine. One end of shaft 1 is enlarged as is indicated at 2 to form a sort of hub and this hub merges into a flange or collar 3 having a flat end face 4. At the center of flange 3 is a recess 5 and in face 4 adjacent to the periphery of flange 3 is an annular groove 6. The outer wall of groove 6 is indicated at 7 and this wall is cut away somewhat so that it is not flush with end face 4 but terminates short thereof.

Attached to flange 3 by suitable fastening means, such as rivets 8, is a flat annular plate 9 having a projection 10 at its center which fits in recess 5. Recess 5 and projection 10 serve to center plate 9 on flange 3. The rivets 8 are located adjacent to the periphery of the plate and flange where the centrifugal stresses are low. As a result, the presence of the openings through which they pass requires that but little additional metal be provided at the peripheries of the flange and plate in order to maintain the strength of the wheel.

In the inner face of plate 9 adjacent to its periphery is an annular groove 11 complementary to groove 6. Outer wall 12 of groove 11 is cut away somewhat also so as to provide an annular space between walls 7 and 12.

Grooves 6 and 11 together provide an annular undercut groove surrounding the periphery of the rotor. Mounted in this groove are the bases 13 of turbine buckets 14, the bases being provided with slots 15 in which walls 7 and 12 are located and with tongues 16 which are located in grooves 6 and 11. There is thus provided a dovetail connection between the buckets and the wheel. The bucket bases are of a width circumferentially such that they engage each other to space the buckets, although under circumstances requiring it, spacing blocks may be used as is well understood.

With the above described construction, it will be seen that there are no openings through the rotor adjacent to its center, which is the region where the greatest stresses occur. This means that the rotor is of maximum strength for the amount of material employed and offers the maximum resistance to centrifugal stresses. Or otherwise considered, it means that the parts may have the minimum weight and size consistent with the service conditions they are required to meet. This is of particular importance in the case of high speed rotors for it decreases the load on the bearings and the ill effect of any unbalance. Also, light weight decreases the time required for acceleration, a thing of great importance in the case of machines which operate at variable speeds. At the same time, however, the rotor is simple in structure and capable of being manufactured at low cost.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A rotor comprising a shaft having a flange integral therewith, said flange presenting a flat end face, a plate having an imperforate central portion, means fastening the plate and flange together, and buckets held between the flange and plate.

2. A rotor comprising a shaft having an integral flange at one end, a plate having an imperforate central portion, means located adjacent to the periphery of the plate for fastening the plate to the flange, and buckets held between the plate and flange.

3. A rotor comprising a shaft having an integral flange at one end, a plate attached to said flange, said plate having an imperforate central portion, complementary annular grooves in adjacent faces of said flange and plate, and buckets held between said plate and flange with their bases located in said grooves.

4. A rotor comprising a shaft having an integral flange at one end, a plate, rivets which extend through the plate and flange adjacent to their peripheries for fastening them together, said plate and flange except for the rivet openings being imperforate, and buckets having their bases held between the peripheries of said plate and flange.

In witness whereof, I have hereunto set my hand this 8th day of September, 1925.

SANFORD A. MOSS.